United States Patent
Seok et al.

(10) Patent No.: US 12,160,778 B2
(45) Date of Patent: Dec. 3, 2024

(54) METHODS AND DEVICES FOR MULTI-LINK CONTENTION BASED ADMISSION CONTROL IN A WIRELESS NETWORK

(71) Applicant: MediaTek Singapore Pte. Ltd., Singapore (SG)

(72) Inventors: Yongho Seok, San Jose, CA (US); Kai Ying Lu, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 125 days.

(21) Appl. No.: 17/476,260

(22) Filed: Sep. 15, 2021

(65) Prior Publication Data

US 2022/0095167 A1    Mar. 24, 2022

Related U.S. Application Data

(60) Provisional application No. 63/080,147, filed on Sep. 18, 2020.

(51) Int. Cl.
*H04W 28/24* (2009.01)
*H04W 28/02* (2009.01)
*H04W 48/06* (2009.01)

(52) U.S. Cl.
CPC ....... *H04W 28/24* (2013.01); *H04W 28/0268* (2013.01); *H04W 48/06* (2013.01)

(58) Field of Classification Search
CPC ............ H04W 28/24; H04W 28/0268; H04W 48/06; H04W 72/1263; H04L 47/41; H04L 47/805; H04L 5/0053; H04L 5/0091
See application file for complete search history.

(56) References Cited

U.S. PATENT DOCUMENTS

| | | | |
|---|---|---|---|
| 2016/0353378 A1* | 12/2016 | Kim | H04W 74/06 |
| 2020/0029350 A1* | 1/2020 | Asterjadhi | H04W 72/543 |
| 2021/0306271 A1* | 9/2021 | Xin | H04L 47/2416 |
| 2022/0287121 A1* | 9/2022 | Hwang | H04W 76/15 |
| 2022/0312522 A1* | 9/2022 | Jang | H04W 76/15 |
| 2022/0416983 A1* | 12/2022 | Song | H04W 72/04 |
| 2023/0011167 A1* | 1/2023 | Chitrakar | H04L 1/1635 |
| 2023/0284303 A1* | 9/2023 | Ko | H04W 76/15 370/310 |
| 2023/0337293 A1* | 10/2023 | Kim | H04W 74/006 |

* cited by examiner

*Primary Examiner* — Kashif Siddiqui

(57) ABSTRACT

Embodiments of the present invention provide methods and devices for performing admission control in a wireless network. Admission control can be used to set usage limits for wireless devices in the network. When admission control is enabled, a wireless station does not transmit frames if the current channel usage time is greater than a predefined time limit. The admission control parameters can be specific to an access category (AC), such as best effort (BE), voice (VO), video (VI), and background (BK). According to some implementations, the admission control is performed on a link-level. According to other implementations, the admission control is performed at a multi-link device (MLD) level.

19 Claims, 10 Drawing Sheets

Figure 9-298—TSPEC element format

Figure 9-299—TS Info field format

METHODS AND DEVICES FOR MULTI-LINK CONTENTION BASED ADMISSION CONTROL IN A WIRELESS NETWORK

CROSS-REFERENCE TO RELATED APPLICATIONS

This application claims the benefit of and priority to provisional patent application Ser. No. 63/080,147, with filing date Sep. 18, 2020, which is hereby incorporated by reference in its entirety.

FIELD

Embodiments of the present invention generally relate to the field of wireless communications. More specifically, embodiments of the present invention relate to systems and methods of admission control in wireless networks.

BACKGROUND

Modern electronic devices typically send and receive data with other electronic devices wirelessly using Wi-Fi, and current Wi-Fi technology typically employs access control techniques to determine which devices can utilize resources of the wireless network to communicate with other devices. A wireless station, or STA, performs a backoff procedure to access the wireless medium. Even if the STA obtains access control, channel usage time may have already reached a time limit and the STA cannot transmit.

Distributed coordination function (DCF) is a fundamental medium access control (MAC) technique of the IEEE 802.11-based WLAN standard. DCF uses carrier-sense multiple access with collision avoidance (CSMA/CA) techniques with a binary exponential backoff algorithm. A DCF station wishing to transmit must listen for the channel status for a DIFS interval. When the channel is busy during the short interframe spacing (DIFS) interval, the station waits to transmit. When multiple stations contend for access to the wireless medium, they may all wait for the station to become available and then attempt to connect at the same time, unfortunately leading to collisions. Therefore, DCF also defines a random backoff that forces stations to defer the access to the channel for an additional period of time.

However, in many cases, more control over access to the wireless medium is desired.

SUMMARY

Accordingly, embodiments of the present invention provide methods and devices for performing admission control in a wireless network. Admission control can be used in addition to access control to set usage limits for wireless devices in the network. When admission control is enabled, a wireless station does not transmit frames if the current channel usage time is greater than a predefined time limit. The admission control parameters can be specific to an access category (AC), such as best effort (BE), voice (VO), video (VI), and background (BK). According to some implementations, the admission control is performed on a link-level. According to other implementations, the admission control is performed at a multi-link device (MLD) level.

According to one embodiment, a method of multi-link admission control in a wireless network is disclosed. The method includes transmitting, by a wireless access point (AP) multi-link device (MLD), a beacon frame indicating that admission control is enabled for a wireless link of the AP MLD, receiving, by the AP MLD, a request to add a traffic stream associated with an access category (AC) for the wireless link from a wireless station (STA) MLD, and transmitting, by the AP MLD, a response to the STA MLD, where the response includes a medium access time granted for Enhanced Distributed Channel Access (EDCA) over the wireless link for the AC.

According to some embodiments, the method further includes transmitting, by the AP MLD, a plurality of quality of service (QoS) frames associated with the access control category to the STA MLD, where the QoS frames are transmitted using EDCA over the wireless link according to the medium access time.

According to some embodiments, the AP MLD stops transmitting QoS frames to the STA MLD after the medium access time is expired.

According to some embodiments, the medium access time is carried in a traffic specification (TSPEC) element.

According to some embodiments, the AP MLD includes a plurality of wireless links requiring admission control, and the medium access time is applied to the plurality of links for Enhanced Distributed Channel Access (EDCA) transmission over the plurality of wireless links.

According to some embodiments, the AP MLD includes a plurality of wireless links requiring admission control, the response includes a plurality of traffic specification (TSPEC) elements corresponding to the plurality of wireless links, and at least one of the plurality of TSPEC elements further includes an MLD medium time indicating a total medium time for the plurality of links requiring admission control.

According to some embodiments, the AP MLD includes a plurality of wireless links requiring admission control, and the method further includes receiving, by the AP MLD, a first request to add a traffic stream associated with a first access control category for a first wireless link of the AP MLD from the STA MLD, and transmitting, by the AP MLD, a first response to the STA MLD, and the first response includes a first medium access time granted for Enhanced Distributed Channel Access (EDCA) over the first wireless link.

According to some embodiments, the method includes receiving, by the AP MLD, a second request to add a traffic stream associated with a second access control category for a second wireless link of the AP MLD from the STA MLD, and transmitting, by the AP MLD, a second response to the second request to the STA MLD, where the second response includes a second medium access time granted for Enhanced Distributed Channel Access (EDCA) over the second wireless link.

According to some embodiments, the AP MLD includes a plurality of wireless links requiring admission control, and the request to add a traffic stream includes an indication of at least one of the plurality of wireless links requiring admission control.

According to some embodiments, the response to the request to the STA MLD includes at least one traffic specification (TSPEC) element identifying at least one of the plurality of wireless links requiring admission control and a corresponding medium time thereof.

According to some embodiments, the access control category includes at least one of: AC_VO, AC_VI, AC_BE, and AC_BK.

According to some embodiments, the method includes receiving, by the AP MLD, a request to terminate the request to add a traffic stream associated with an access control category for the wireless link from the STA MLD.

According to some embodiments, the request to terminate the request to add a traffic stream associated with an access control category for the wireless link is carried in a delete traffic stream (DELTS) frame.

According to a different embodiment, a method of multi-link admission control for a wireless network is disclosed. The method includes transmitting, by a wireless station (STA) multi-link device (MLD), a request to add a traffic stream associated with an access category (AC) for a wireless link of the STA MLD to a wireless access point (AP) MLD, and receiving, by the STA MLD, a response from the AP MLD, where the response includes a medium access time granted for Enhanced Distributed Channel Access (EDCA) over the wireless link for the AC.

According to some embodiments, the method includes receiving, by the STA MLD, a plurality of quality of service (QoS) frames associated with the access control category from the AP MLD, where the QoS frames are transmitted using EDCA over the wireless link according to the medium access time.

According to some embodiments, the AP MLD stops transmitting QoS frames to the STA MLD after the medium access time is expired.

According to some embodiments, the AP MLD includes a plurality of wireless links requiring admission control, and the medium access time is applied to the plurality of links for EDCA transmission over the plurality of wireless links.

According to some embodiments, the AP MLD includes a plurality of wireless links requiring admission control, where the response includes a plurality of TSPEC elements corresponding to the plurality of wireless links, and where at least one of the plurality of TSPEC elements further includes an MLD medium time indicating a total medium time for the plurality of links requiring admission control.

According to some embodiments, the AP MLD includes a plurality of wireless links requiring admission control, and the method includes receiving, by the AP MLD, a first request to add a traffic stream associated with a first access control category for a first wireless link of the AP MLD from the STA MLD, transmitting, by the AP MLD, a first response to the STA MLD, where the first response includes a first medium access time granted for Enhanced Distributed Channel Access (EDCA) over the first wireless link, receiving, by the AP MLD, a second request to add a traffic stream associated with a second access control category for a second wireless link of the AP MLD from the STA MLD, and transmitting, by the AP MLD, a second response to the STA MLD, and where the second response includes a second medium access time granted for Enhanced Distributed Channel Access (EDCA) over the second wireless link.

According to a different embodiment, an apparatus is disclosed. The apparatus includes a plurality of transceivers operating different wireless links, a memory, and a processor operable to transmit a beacon frame indicating that admission control is enabled for a wireless link, receive a request to add a traffic stream associated with an access control category for the wireless link from a wireless station (STA) MLD over the wireless link, and transmit a response to the STA MLD over the wireless link, where the response includes a medium access time granted for Enhanced Distributed Channel Access (EDCA) over the wireless link.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
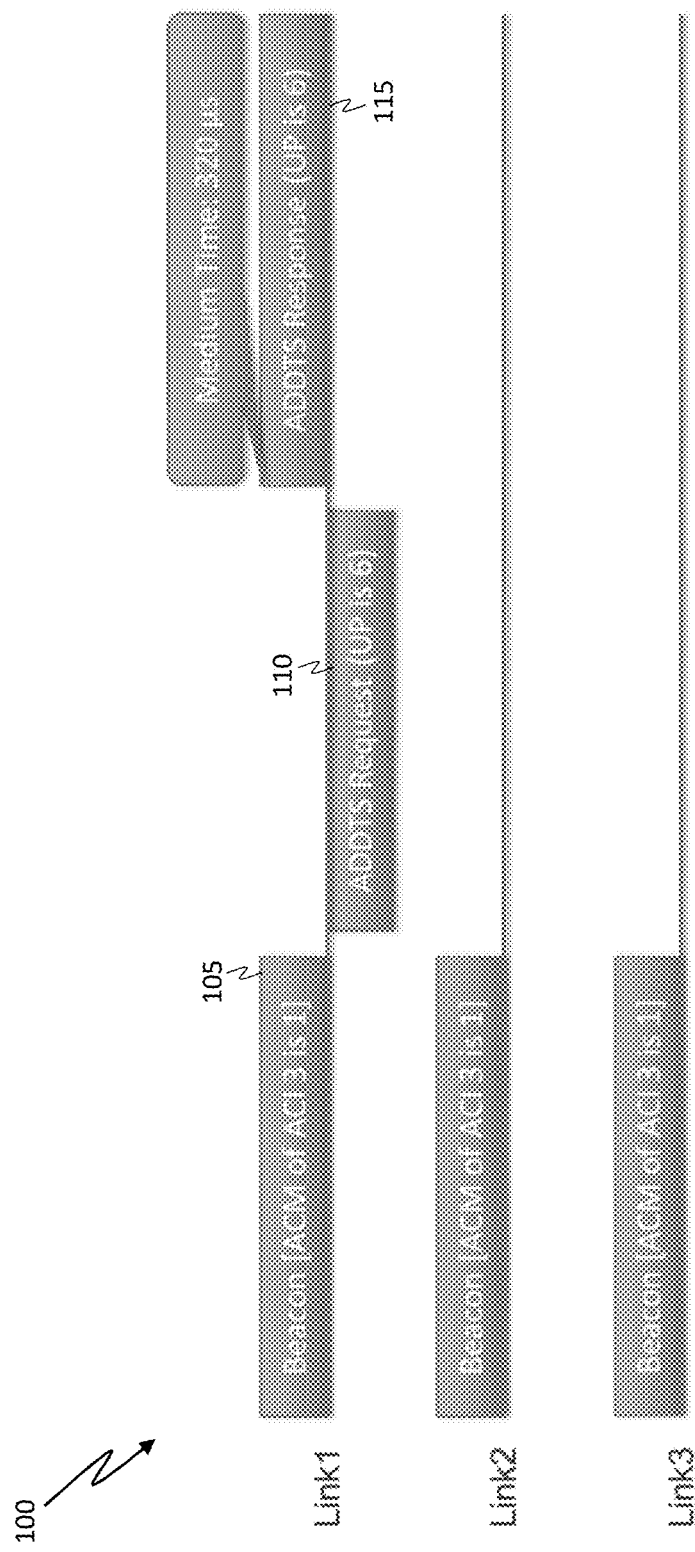
FIG. 1 is an exemplary block transmission timing diagram for multi-link link-level contention-based admission control in accordance with embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 7-9) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic announces capable of being stored, transferred, combined, compared, and otherwise manipulated in a computer system. It has proven convenient at times, principally for reasons of common usage, to refer to these announces as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "receiving," "retransmitting," "authenticating," "identifying," "requesting," "reporting," "determining," or the like, refer to the action and processes of a computer system, or similar electronic processors, computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Multi-Link Link-Level Contention Based Admission Control for a Wireless Network

Embodiments of the present invention provide methods and devices for performing admission control in a wireless network. Admission control can be used to access control to set usage limits for wireless devices in the network. When admission control is enabled, a wireless station does not transmit frames if the current channel usage time is greater than a predefined time limit applicable to the wireless station. The admission control parameters can also be specific to an access category (AC), such as best effort (BE), voice (VO), video (VI), and background (BK). According to some implementations, the admission control is performed on a link-level. According to other implementations, the admission control is performed at a multi-link device (MLD) level.

An AP that is not using or support admission control procedures should at least advertise that admission control is not mandatory on its ACs. An AP can use the admission control mandatory (ACM) subfields advertised in an enhanced distributed channel access (EDCA) parameter set element to indicate whether admission control is required for each access category (AC). All ACs with priority higher than that of an AC for which the ACM subfield is set to 1 should also have the ACM subfield set to 1. While the CWmin, CWmax, AIFS, and TXOP limit parameters may be adjusted over time by the AP, the ACM subfield is static for the duration of the lifetime of the BSS. Otherwise, a non-AP STA may send frames in an AC where admission control is not mandated.

A non-AP STA may support an admission control procedure to send frames in an AC where admission control is mandated. If it does not support that procedure or admission was denied, it may send such frames using the EDCA parameters of that lower priority AC for channel access when both of the following conditions are met:
1. dot11RejectUnadmittedTraffic is false or not present
2. There is a lower priority AC that does not require admission control Otherwise, if these conditions are not met, the non-AP STA does not send the frames.

An STA can transmit an add traffic stream (ADDTS) request frame to the hybrid coordinator (HC) to request admission of traffic in any direction (e.g., uplink, downlink, direct, or bidirectional) employing an AC that requires admission control. The ADDTS Request frame includes the user priority (UP) associated with the traffic and indicates EDCA as the access policy. The AP maps the received UP of the ADDTS Request frame with the appropriate AC, for example, using the per the UP-to-AC mappings described in IEEE Std 802.11-2012, 10.2.3.2 (HCF contention-based channel access (EDCA)).

The AP responds to an ADDTS Request frame with an ADDTS Response frame that to accept or deny the request regardless of the AC's ACM setting. Upon receipt of an ADDTS Request frame from a non-AP STA, the AP determines whether to accept or deny the request. The decision can be based on the policies delivered by the SSPN that are stored in the dot11InterworkingEntry, which is part of the dot11InterworkingTable, for example. If the AP decides to accept the request, the AP also derives the wireless medium time threshold from the information conveyed in the traffic specification (TSPEC) element in the ADDTS Request frame. IEEE 802.11 K.2.2 (Deriving medium time) provides one exemplary process for deriving the medium time for admission control purposes.

Once the determination to accept or deny the request is made, the AP transmits a TSPEC element to the requesting non-AP STA contained in an ADDTS Response frame. If the AP is accepting the request, the medium time field in the response frame is set to a non-zero value. If the AP is accepting a request for a downlink traffic stream, the Medium Time field is set to 0. If the AP is accepting a request corresponding to an AC for which ACM is 0 (e.g., the TSPEC is to change APSD behavior), the Medium Time field is set to 0.

The enhanced distributed channel access function (EDCAF) for each wireless link maintains admitted_time and used_time medium-access control (MAC) variables. The admitted_time and used_time is set to 0 at the time of association (or reassociation). The STA may subsequently decide to explicitly request a medium time for the AC that is associated according to the specified priority. To make such a request, the STA transmits a TSPEC element in an ADDTS Request frame specifying values for the following fields: Nominal MSDU Size, Mean Data Rate, Minimum PHY Rate, Inactivity Interval, and Surplus Bandwidth Allowance. The Medium Time field is not used in the request frame and is set to 0. Upon receipt of a TSPEC element contained in an ADDTS Response frame indicating that the request has been accepted, the STA then recomputes the admitted_time for the specified EDCAF as:

admitted_time=admitted_time+
dot11EDCAAveragingPeriod×medium time of TSPEC

The STA may tear down (terminate/cancel) the explicit request at any time. For the teardown of an explicit admission, the STA transmits a delete traffic stream (DELTS) frame containing the traffic stream ID (TSID) and direction that specify the TSPEC to the AP. If the STA sends or receives a DELTS frame, the admitted_time value is recomputed for the specified EDCAF as:

admitted_time=admitted_time−
dot11EDCAAveragingPeriod×medium time of TSPEC.

The MAC variable used_time is the amount of time used by an STA in dot11EDCAAveragingPeriod (typically represented in units of 32 μs). The MAC variable admitted_time is the wireless medium time threshold allowed by the AP, in dot11EDCAAveragingPeriod. The STA updates the value of used_time at intervals defined in dot11EDCAAveragingPeriod as:

used_time=max((used_time−admitted_time), 0)

The STA updates the value of used_time after each successful or unsuccessful frame exchange sequence as:

used_time=used_time+MPDUExchangeTime

MPDUExchangeTime is the duration of the frame exchange sequence. For an MPDU transmitted with Normal Ack ack policy and without RTS/CTS protection, this value is equal to the time required to transmit the MPDU plus the time required to transmit the expected response frame (plus one SIFS). Frame exchange sequences that do not include any Data frames and any RD transmission granted by the AP are excluded from the used_time update. If the used_time value reaches or exceeds the admitted_time value, the corresponding EDCAF can no longer transmit QoS frames (e.g., QoS Data frames and QoS Null frames) using the EDCA parameters for that AC specified in the QoS Parameter Set element. The STA may choose to temporarily replace the EDCA parameters for that EDCAF with those specified for an AC of a lower priority if no admission control is required for those ACs.

It should be noted that the TID field of that frame is not modified when a frame is transmitted using temporary EDCA parameters. For example, if an STA has made and accepted an explicit admission for a TS and the channel conditions subsequently worsen (e.g., a change in PHY data rate requiring more time to send the same data), the STA may make a request to the AP to increase admitted_time and downgrade the EDCA parameters for that AC for a short time in order to send some of the traffic at the admitted priority and some at the unadmitted priority while waiting for a response to the admission request.

Each AP in an AP MLD may perform an admission control procedure for each link independently. Each AP sets the ACM (admission control mandatory) subfields in the EDCA Parameter Set element to indicate whether an admission control is required for each of the ACs on each link. When more than one AP in an AP MLD requires an admission control for the same AC, an STA in the non-AP MLD ("STA MLD") transmits an ADDTS Request frame for that AC to request admission of traffic on more than one link. The ADDTS Request frame may include the link information on which admission of traffic is requested. An AP in the AP MLD transmits an ADDTS Response frame for that AC associated with more than one link. The AP includes the wireless medium time threshold that specifies the granted time for EDCA access in the TSPEC element in the ADDTS Response frame. The corresponding wireless medium time threshold is then applied to the links requiring admission control.

FIG. 1 is an exemplary block transmission timing diagram 100 for multi-link link-level contention-based admission control in accordance with embodiments of the present invention. In the example of FIG. 1, an AP MLD operating over links 1-3 announces that an admission control for the access category index (ACI) 3 (equivalent to AC_VO) is required on links 1-3 by setting the ACM field in beacon frames 105, 110, and 115 to 1. A non-AP (STA) MLD transmits ADDTS Request 120 having UP set to 6 (equivalent to the AC_VO) to the AP MLD over link 1. The AP MLD accepts the request for the AC_VO by transmitting ADDTS Response frame 125, where the wireless medium time threshold is set to 320 μs is for EDCA access. In this way, the AP MLD can specify the wireless medium time threshold for each link independently using separate ADDTS responses.

Each STA in the non-AP MLD calculates the admitted_time for each link as the following, where a same wireless medium time threshold of 320 μs is applied to each link.

admitted_time=admitted_time+
dot11EDCAAveragingPeriod×medium time of TSPEC.

An AP MLD may grant different wireless medium time threshold for EDCA access on each link. An STA in a non-AP MLD transmits an ADDTS Request frame for an AC to request admission of traffic on more than one link. The ADDTS Request frame may include the link information for the link on which admission of traffic is requested. An AP in the AP MLD transmits an ADDTS Response frame for that AC, and the ADDTS Response frame includes more than one TSPEC element (for more than one link). The wireless medium time threshold in each TSPEC element in the ADDTS Response frame specifies the granted wireless medium time threshold for EDCA access on a specific link corresponding to the TSPEC element.

Figure 2:
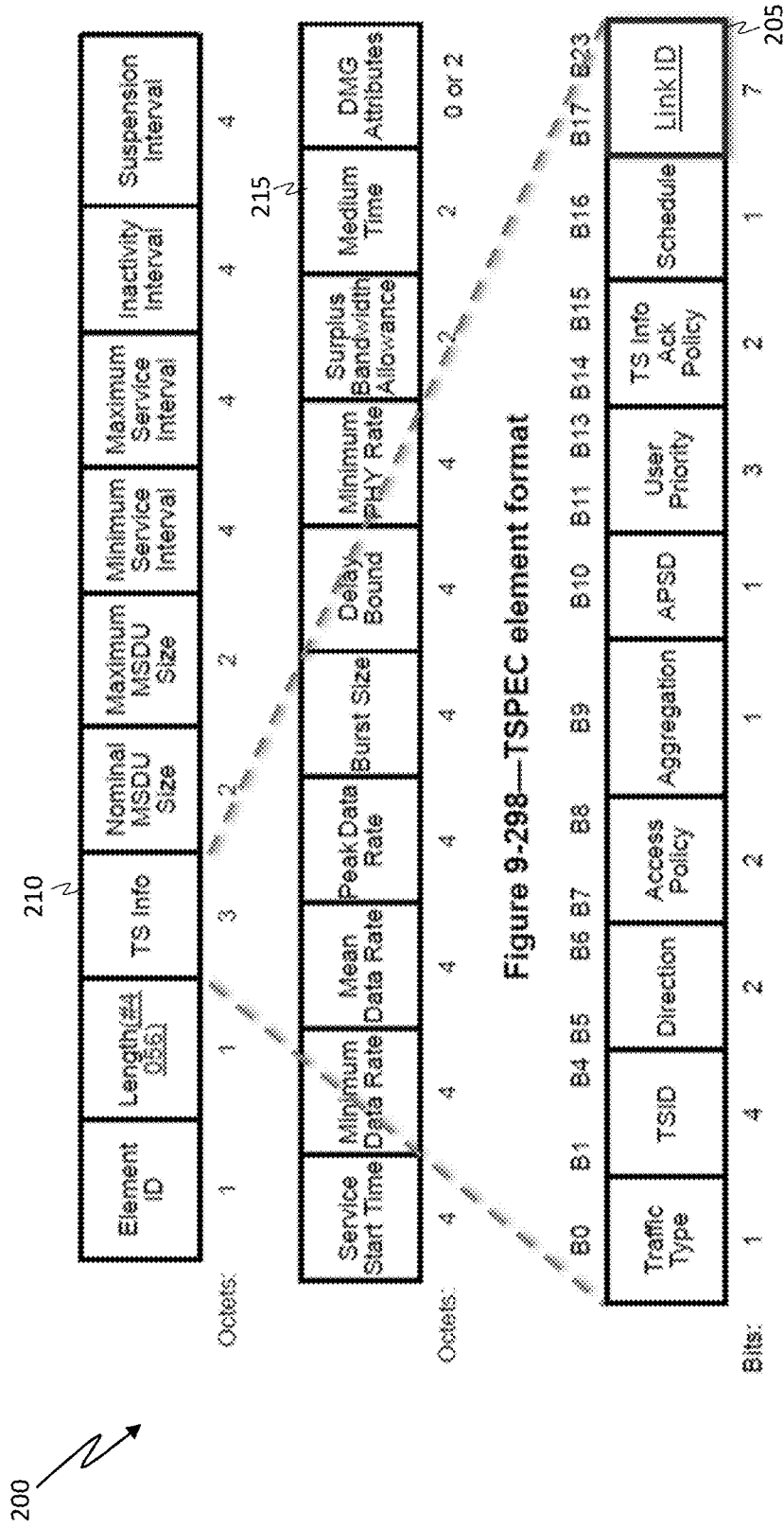
FIG. 2 is a block diagram depicting an exemplary TSPEC element for EDCA access using admission control according to embodiments of the present invention.

FIG. 2 is a block diagram depicting an exemplary TSPEC element 200 for EDCA access to the wireless medium using admission control according to embodiments of the present invention. Link ID field 205 of TS info field 210 indicates the link on which the corresponding TSPEC element is associated and applied. The medium time field 215 in each TSPEC element in the ADDTS Response frame specifies the granted wireless medium time for EDCA access on a specific link identified in link ID field 205.

Figure 3:
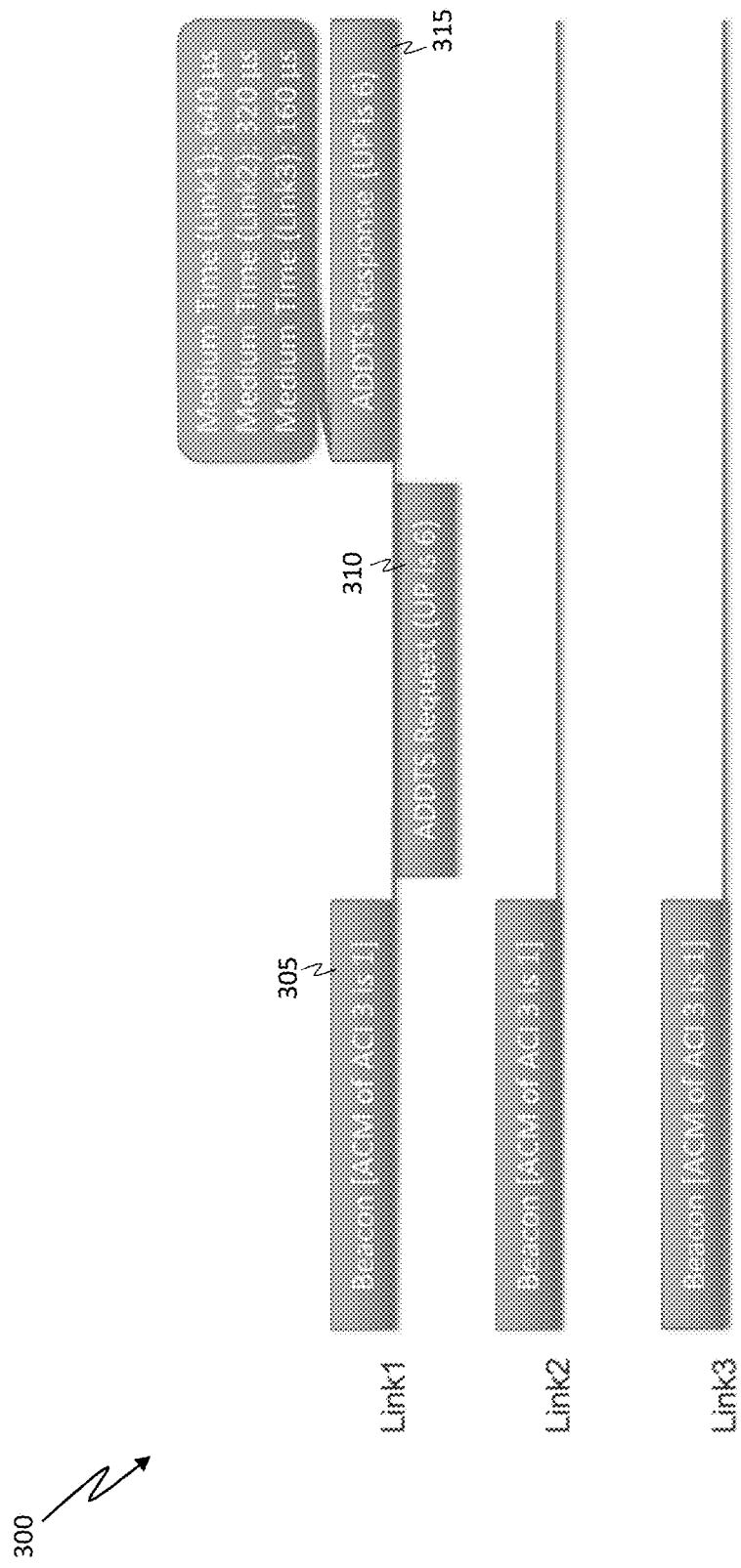
FIG. 3 is a block transmission timing diagram for configuring the wireless medium time threshold of multiple links for multi-link link-level contention-based admission control in accordance with embodiments of the present invention.

FIG. 3 is a block transmission timing diagram 300 for configuring the wireless medium time of multiple links for exemplary multi-link link-level contention-based admission control in accordance with embodiments of the present invention. An STA in a non-AP MLD transmits an ADDTS Request 310 for UP 6 responsive to a beacon 305 having ACM set to 1 for ACI 3. The AP MLD accepts the request for the AC_VO by transmitting ADDTS Response frame 315, where multiple TSPEC elements are carried in the ADDTS Response frame with exemplary medium times 640 μs is for link 1, 320 μs is for link 2, and 160 μs is for link 3.

The STAs in the non-AP (STA) MLD calculates the admitted_time for each link as the following, and a different medium time is applied to each link.

admitted_time=admitted_time+
dot11EDCAAveragingPeriod×medium time of TSPEC.

Alternatively, each STA in a non-AP (STA) MLD may transmit an ADDTS Request frame specific to that AC requesting admission of traffic on the active link of the STA when more than one AP in an AP MLD requires admission control for the same AC. The TSID is maintained in the MLD level. For the same UP or the same TCLAS, the TSID subfield in the TS Info field in the TSPEC element in the ADDTS Request frame sent by each STA is set to the same value.

APs in the AP MLD transmit an ADDTS Response frame for the AC of the link on which that AP is operating. The AP includes the medium time that specifies the granted time for EDCA access in the TSPEC element of the ADDTS Response frame. The corresponding medium time is applied to the link.

Figure 4:
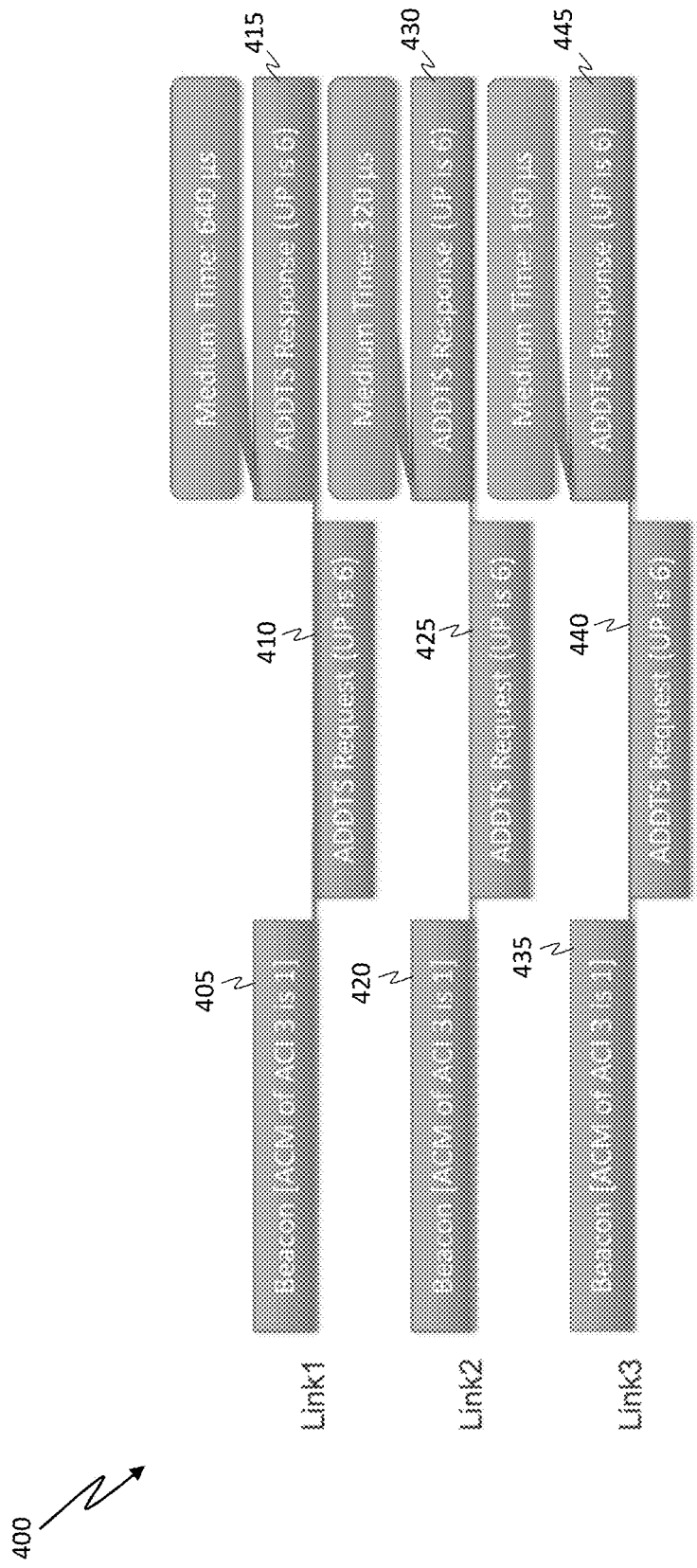
FIG. 4 is an exemplary block transmission timing diagram for configuring the wireless medium time threshold of multiple links using separate ADDTS requests for multi-link link-level contention-based admission control in accordance with embodiments of the present invention.

FIG. 4 is a block transmission timing diagram 400 for configuring the medium time of multiple links using separate ADDTS requests for exemplary multi-link link-level contention-based admission control in accordance with embodiments of the present invention. As depicted in FIG. 4, each STA in the non-AP MLD transmits an ADDTS Request 410 for UP 6 responsive to a beacon 405 having ACM set to 1 for ACI 3. Each responding AP in the AP MLD accepts the request for the AC_VO by transmitting an ADDTS Response frame with a medium time specified in the TSPEC element of an ADDTS Response frame (e.g., 640 μs is for link 1, 320 μs is for link 2, and 160 μs is).

Each STAs in the non-AP MLD calculates the admitted_time for each link as:
admitted_time=admitted_time+
dot11EDCAAveragingPeriod×medium time of TSPEC.

Multi-Link MLD-Level Contention Based Admission Control in a Wireless Network

In addition to the Multi-Link Link-Level Contention based Admission Control, an AP MLD may require an admission control of total traffic used on all links (referred to as MLD level admission control) of the wireless network. The AP MLD transmits sets the MLD ACM subfields in the MLD Operation element to indicate that an admission control is required for the ACs of a non-AP (STA) MLD:

MLD ACM AC_VO: Indicates MLD level admission control enabled for AC_VO traffic.
MLD ACM AC_VI: Indicates MLD level admission control enabled for AC_VI traffic.
MLD ACM AC_BE: Indicates MLD level admission control enabled for AC_BE traffic.
MLD ACM AC_BK: Indicates MLD level admission control enabled for AC_BK traffic.

Figure 5:
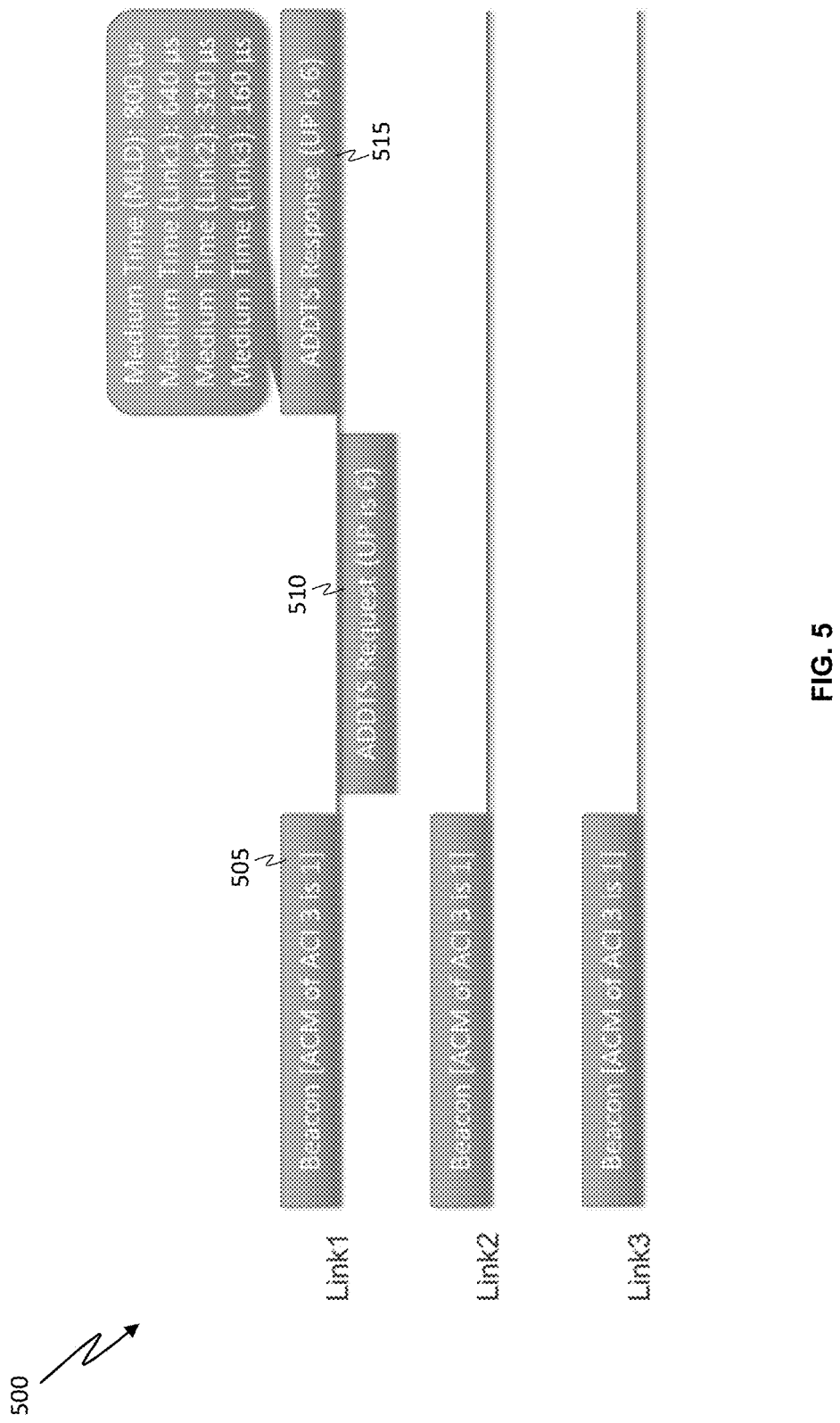
FIG. 5 is an exemplary block transmission timing diagram for configuring the wireless medium time threshold of multiple links for multi-link MLD-level contention-based admission control in accordance with embodiments of the present invention.

FIG. 5 is an exemplary block transmission timing diagram 500 for configuring the wireless medium time threshold of multiple links using a medium time for multi-link MLD-level contention-based admission control in accordance with embodiments of the present invention. When the MLD level admission control is required for each of ACs, an STA in a non-AP MLD transmits ADDTS Request frame 510 for each AC to request admission of total traffic used on all links responsive to beacon 505 having ACM set to 1 for ACI 3. An AP in an AP MLD transmits ADDTS Response frame 510 for the requested AC to grant the total medium time used for EDCA access on all links.

The AP MLD accepts the request for the AC_VO by transmitting ADDTS Response frame 515, where multiple TSPEC elements are carried in the ADDTS Response frame with the following exemplary medium times:

The MLD medium time in the TSPEC element for all links is 800 μs is.
The link medium time in the TSPEC element for link 1 is set to 640 μs is.
The link medium time in the TSPEC element for link 2 is set to 320 μs is The link medium time in the TSPEC element for link 3 is set to 160 μs is A non-AP MLD calculates the MLD_admitted_time as:
MLD_admitted_time=MLD_admitted_time+
dot11EDCAAveragingPeriod×MLD medium time of TSPEC.

A non-AP (STA) MLD maintains the MAC variable MLD_used_time that represents the amount of time used on all links requiring admission for that AC by one or more STAs in the non-AP MLD within the time period defined in dot11EDCAAveragingPeriod. The MAC variable MLD_admitted_time is the medium time allowed by the AP MLD, in units of 32 μs is, in dot11EDCAAveragingPeriod. The non-AP MLD updates the value of MLD_used_time at intervals defined according to dot11EDCAAveragingPeriod as:

MLD_used_time=max((MLD_used_time−admitted_time), 0)

The non-AP MLD updates the value of MLD_used_time after each successful or unsuccessful frame exchange sequence on all links as:
MLD_used_time=MLD_used_time+MPDUExchangeTime If the MLD_used_time value reaches or exceeds the MLD_admitted_time value, the corresponding EDCAFs of one or more STAs in the non-AP MLD no longer transmits QoS Data or QoS Null frames using the EDCA parameters for that AC.

Figure 6:
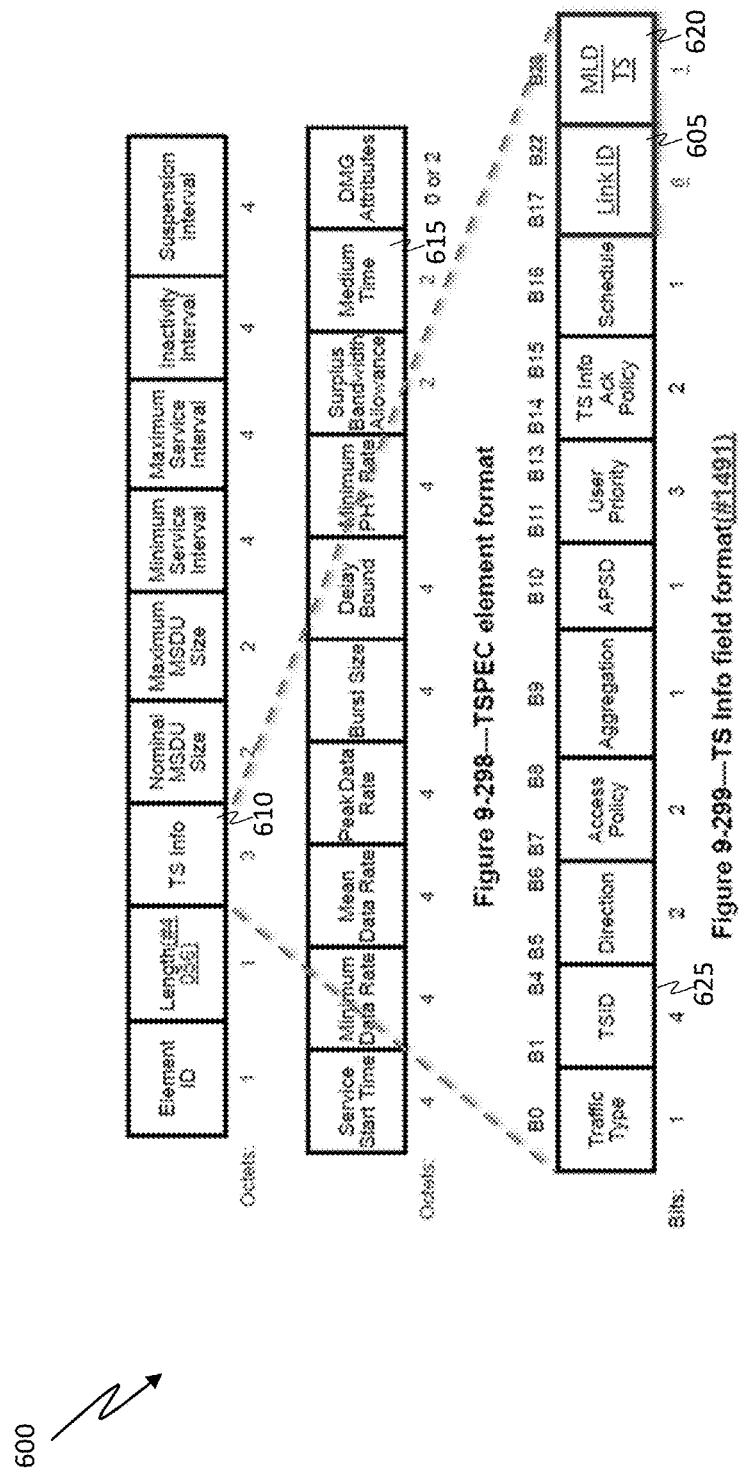
FIG. 6 is a block diagram depicting an exemplary TSPEC element for EDCA access using admission control according to embodiments of the present invention.

FIG. 6 is a block diagram depicting an exemplary TSPEC element 600 for EDCA access using admission control according to embodiments of the present invention. Link ID field 605 of TS info field 610 indicates the link on which the corresponding TSPEC element is associated and applied. The wireless medium time field 615 in each TSPEC element in the ADDTS Response frame specifies the granted medium time for EDCA access on a specific link identified in link ID field 605. MLD TS 620 is set to 1 to indicate that the TSPEC is to grant the total wireless medium time used for EDCA access on all links (the TSPEC is used for the MLD level admission control). Otherwise, MLD TS 620 is set to 0. Specifically, if the MLD TS is set to 1, wireless medium time 615 represents the MLD medium time. If the MLD TS is set to 0, wireless medium time 615 represents the link medium time.

Multi-Link MLD-level Contention Based Teardown Process in a Wireless Network

After requesting multi-link contention-based admission control, a non-AP (STA) MLD may choose to tear down the explicit request at any time. For the teardown of an explicit admission, the MLD transmits a DELTS frame containing TSID 625 indicating the TSPEC to the corresponding AP MLD.

If the TS teardown is for a specific link, Link ID subfield 605 in TS Info field 610 identifies the link. In this case, the teardown is only applied to the link identified in Link ID subfield 605. If the TS teardown is for all links, MLD TS subfield 620 in the TS Info field 610 is set. In this case, the teardown is applied to all links associated with TSID 625.

If the non-AP MLD sends or receives a DELTS frame for the specific link, the admitted_time for the specified EDCAF of that link is recomputed as:
admitted_time=admitted_time−
dot11EDCAAveragingPeriod×medium time of TSPEC If the non-AP MLD sends or receives a DELTS frame for all links (MLD TS is equal to 1), it recomputes the MLD_admitted_time for the specified EDCAF of all links as:

MLD_admitted_time=MLD_admitted_time−
dot11EDCAAveragingPeriod×MLD medium time of TSPEC.

Figure 7:
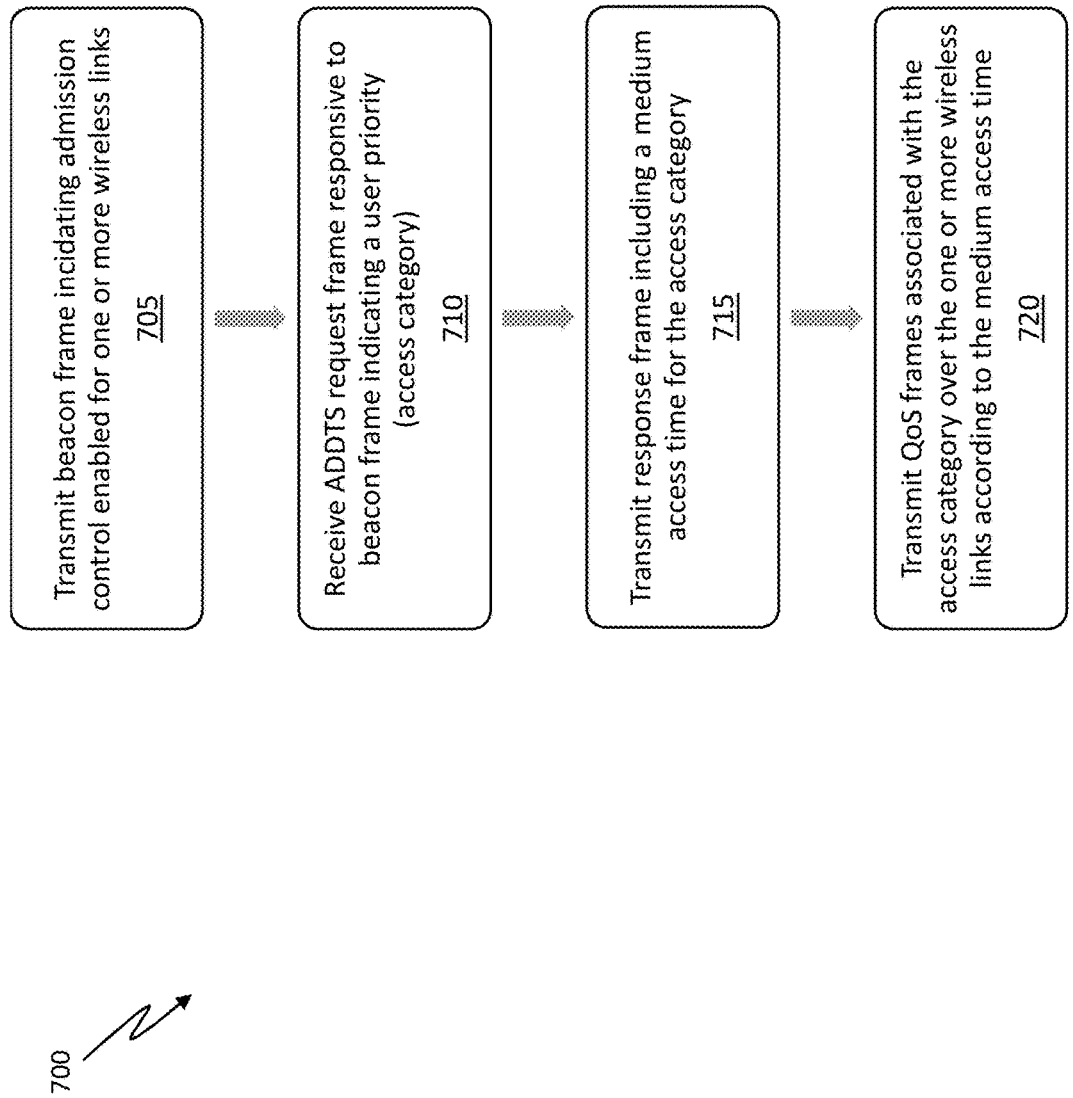
FIG. 7 is a flowchart of an exemplary computer implemented process for multi-link contention-based admission control by an AP MLD in accordance with embodiments of the present invention

FIG. 7 is a flowchart of an exemplary computer implemented process 700 for multi-link contention-based admission control for a wireless network by an AP MLD in accordance with embodiments of the present invention. Process 700 can include performing link-level or MLD-level admission control.

At step 705, a beacon frame is transmitted by the AP MLD indicating admission control mandatory (ACM) for one or more wireless links. The beacon frame can indicate an access control index corresponding to an access category (e.g., ACI 3 is mapped to AV_VO).

At step 710, an ADDTS request frame is received by the AP MLD over one or more wireless links. Each ADDTS request frame indicates a user priority corresponding to the access category (e.g., UP 6 is mapped to AC_VO) for use on the wireless link used to transmit the request.

At step 715, one or more ADDTS response frames are received by the AP MLD responsive to the one or more ADDTS request frames transmitted in step 710. Each ADDTS response frame includes a wireless medium time for performing admission control. The ADDTS response frame includes one or more TSPEC elements corresponding to the wireless links used to transmit the ADDTS request frames in step 710. The TSPEC elements include a medium access time for performing link-level admission control on the corresponding wireless link. The ADDTS response frames can optionally include an MLD-level medium time that is applied to all wireless links.

At step 720, the AP MLD transmits and/or receives a plurality of quality of service (QoS) frames associated with the access control category to/from the STA MLD. The QoS frames are transmitted using EDCA over the wireless link according to the medium access time.

Figure 8:
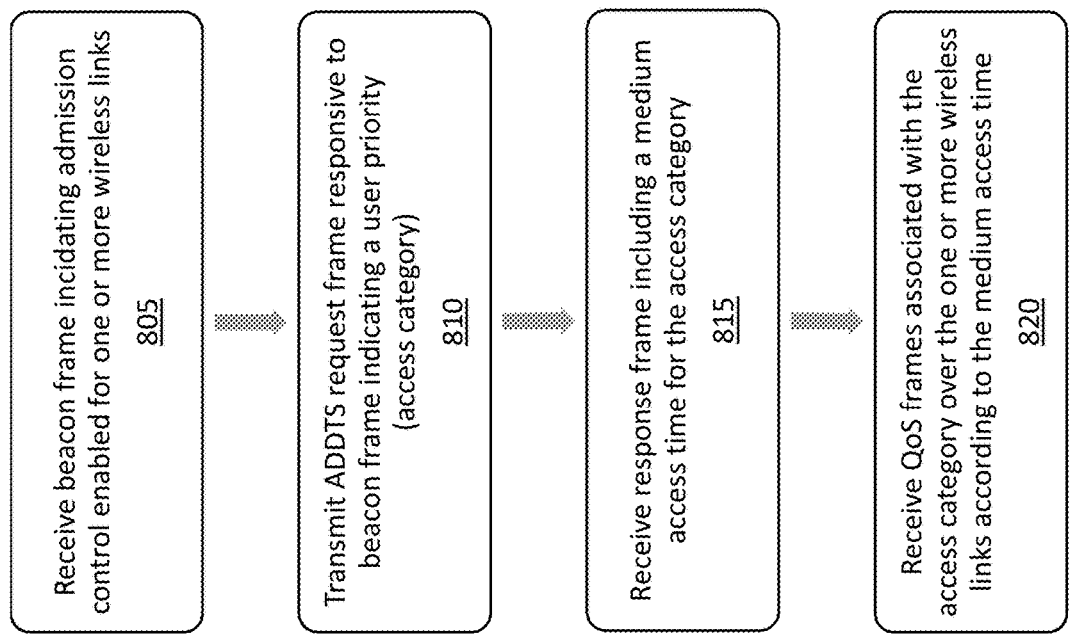
FIG. 8 is a flowchart of an exemplary computer implemented process for multi-link contention-based admission control by a non-AP (STA) MLD in accordance with embodiments of the present invention.

FIG. 8 is a flowchart of an exemplary computer implemented process 800 for multi-link contention-based admission control of a wireless network by a non-AP (STA) MLD in accordance with embodiments of the present invention. Process 800 can include performing link-level or MLD-level admission control.

At step 805, a beacon frame is received by the STA MLD indicating admission control mandatory (ACM) for one or more wireless links. The beacon frame can indicate an access control index corresponding to an access category (e.g., ACI 3 is mapped to AV_VO).

At step 810, an ADDTS request frame is transmitted by the STA MLD over one or more wireless links. Each ADDTS request frame indicates a user priority corresponding to the access category (e.g., UP 6 is mapped to AC_VO) for use on the wireless link used to transmit the request.

At step 815, one or more ADDTS response frames are received by the STA MLD responsive to the one or more ADDTS request frames transmitted in step 710. Each ADDTS response frame includes a wireless medium time for performing admission control to the wireless network. The ADDTS response frame includes one or more TSPEC elements corresponding to the wireless links used to transmit the ADDTS request frames in step 710. The TSPEC elements include a medium access time for performing link-level admission control on the corresponding wireless link. The ADDTS response frames can optionally include an MLD-level medium time that is applied to all wireless links.

At step 820, the STA MLD transmits and/or receives a plurality of quality of service (QoS) frames associated with the access control category to/from the STA MLD. The QoS frames are transmitted using EDCA over the wireless link according to the medium access time. Step 820 can include the STA MLD computing an admitted_time and/or an MLD_admitted time value for performing admission control as described above according to embodiments of the present invention.

Figure 9:
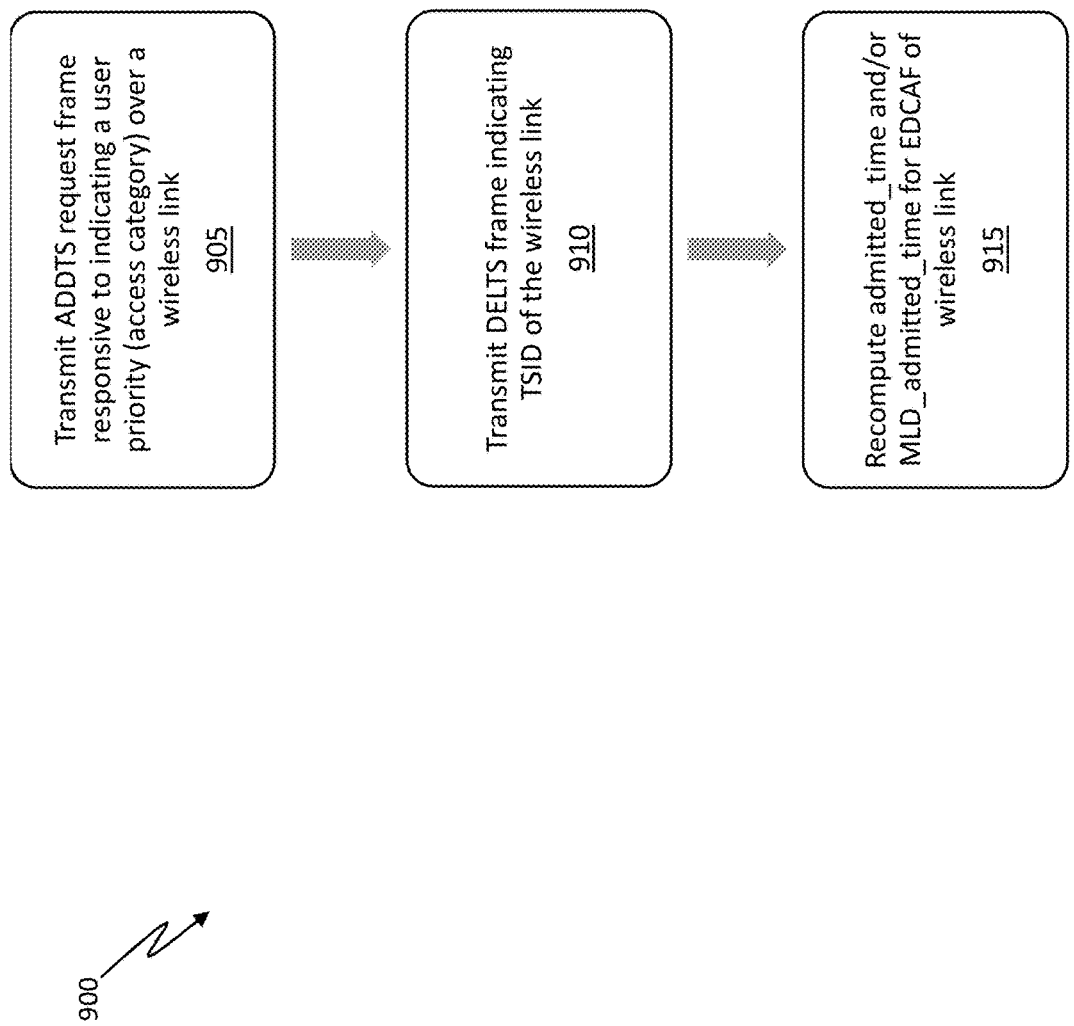
FIG. 9 is a flowchart of an exemplary computer implemented process for performing admission control teardown according to embodiments of the present invention.

FIG. 9 is a flowchart of an exemplary computer implemented process 900 for performing admission control teardown according to embodiments of the present invention in a wireless network.

At step 905, an STA MLD transmit an ADDTS request frame responsive to indicating a user priority (access category) over a wireless link.

AT step 910, the STA MLD transmit a DELTS frame indicating TSID of the wireless link to teardown the admission control on the wireless link.

At step 915, the STA MLD recomputes admitted_time and/or MLD_admitted_time for EDCAF of the wireless link.

Exemplary Computer Controlled System

Figure 10:
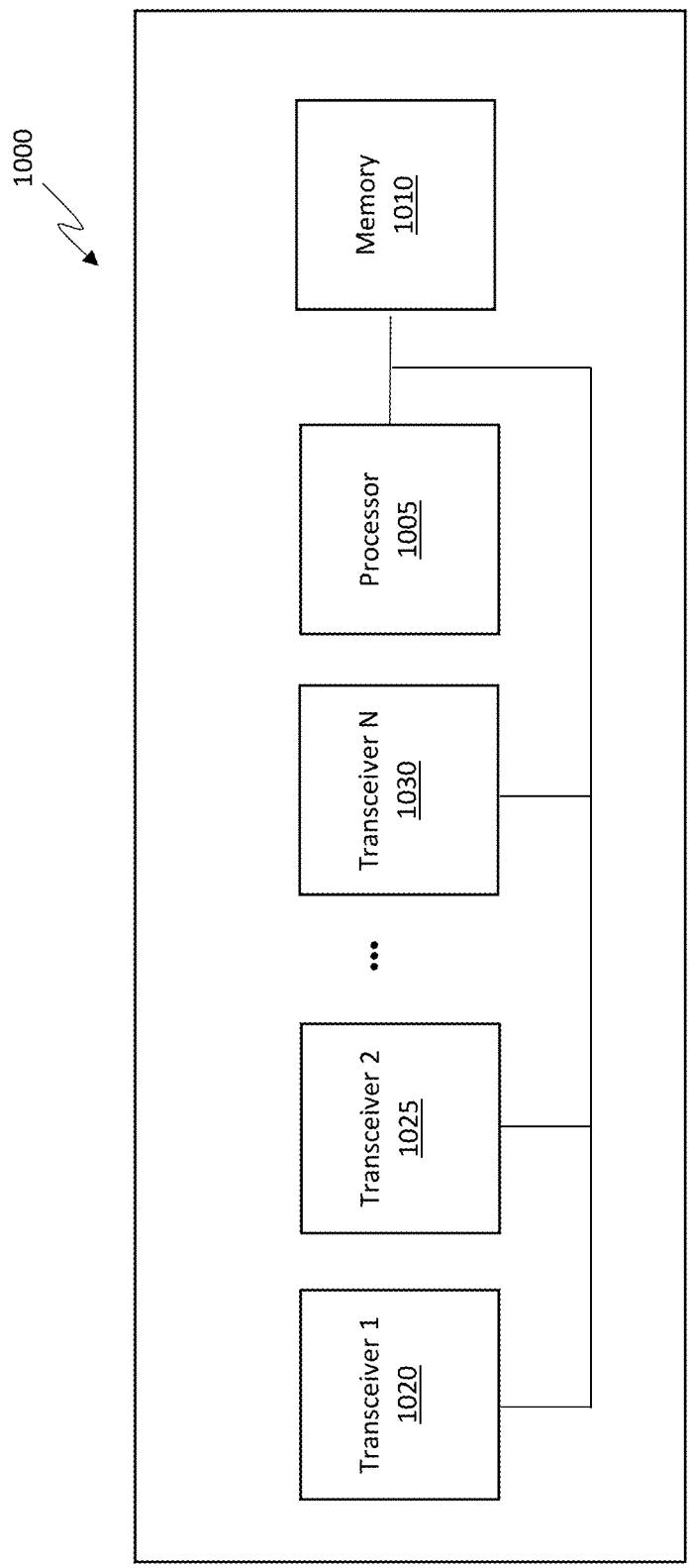
FIG. 10 is a block diagram depicting an exemplary computer system platform upon which embodiments of the present invention may be implemented.

FIG. 10 depicts an exemplary wireless device 1000 upon which embodiments of the present invention can be implemented. Embodiments of the present invention are drawn to electronic systems (e.g., multi-link devices) capable of performing contention-based admission control over multiple wireless links.

The wireless device 1000 includes a processor 1005 for running software applications and optionally an operating system. Memory 1010 can include read-only memory and/or random access memory, for example, to store applications and data (e.g., tables of index values) for use by the processor 1005 and data received or transmitted by transceivers 1020, 1025, and 1030 over different wireless links. The wireless device 1000 can include fewer or more transceivers according to some embodiments. The transceivers 1020, 1025, 1030 communicate with other electronic devices over a wireless network (e.g., WLAN) and typically operates according to IEEE standards (e.g., IEEE 802.11ax, IEEE 802.11ay, IEEE 802.11be, etc.). Contention-based admission control can be used to configure a medium access time for one or more wireless links of the multi-link device and/or an MLD medium access time for EDCA access using a specified access category.

Embodiments of the present invention are thus described. While the present invention has been described in particular embodiments, it should be appreciated that the present invention should not be construed as limited by such embodiments, but rather construed according to the following claims.

What is claimed is:

1. A method of multi-link admission control in a wireless network, the method comprising:
   transmitting, by a wireless access point (AP) multi-link device (MLD), a beacon frame indicating that admission control is enabled for a wireless link of the AP MLD, wherein the AP MLD comprises a plurality of wireless links requiring admission control;
   receiving, by the AP MLD, a request to add a traffic stream associated with an access category (AC) for the wireless link from a wireless station (STA) MLD;
   transmitting, by the AP MLD, a response to the STA MLD, wherein the response comprises a medium access time granted for Enhanced Distributed Channel Access (EDCA) over the wireless link for the AC, wherein the STA MLD computes a total medium time allowed over the wireless link for the AC based on the medium access time granted in the response, wherein the STA MLD computes an amount of medium time used following a successful frame exchange on the wireless link; and the AP MLD denying a subsequent request to add a traffic stream on the AC for EDCA when the amount of medium time used reaches the total medium time allowed over the wireless link for the AC, and wherein access control is performed by the AP MLD over the plurality of wireless links requiring admission control separately using different medium access time granted values.

2. The method of claim 1, further comprising transmitting, by the AP MLD, a plurality of quality of service (QOS) frames associated with the access control category to the STA MLD, wherein the QoS frames are transmitted using EDCA over the wireless link according to the medium access time.

3. The method of claim 2, wherein the AP MLD stops transmitting QoS frames to the STA MLD after the medium access time is expired.

4. The method of claim 1, wherein the medium access time is carried in a traffic specification (TSPEC) element.

5. The method of claim 1, and wherein the medium access time is applied to the plurality of links for Enhanced Distributed Channel Access (EDCA) transmission over the plurality of wireless links.

6. The method of claim 1,
wherein the response comprises a plurality of traffic specification (TSPEC) elements corresponding to the plurality of wireless links, and
wherein at least one of the plurality of TSPEC elements further comprises the MLD medium access time granted.

7. The method of claim 1 further comprising:
receiving, by the AP MLD, a first request to add a traffic stream associated with a first access control category for a first wireless link of the AP MLD from the STA MLD; and
transmitting, by the AP MLD, a first response to the STA MLD, wherein the first response comprises a first medium access time granted for Enhanced Distributed Channel Access (EDCA) over the first wireless link.

8. The method of claim 7, further comprising:
receiving, by the AP MLD, a second request to add a traffic stream associated with a second access control category for a second wireless link of the AP MLD from the STA MLD; and
transmitting, by the AP MLD, a second response to the second request to the STA MLD, wherein the second response comprises a second medium access time granted for Enhanced Distributed Channel Access (EDCA) over the second wireless link.

9. The method of claim 1, wherein the request to add a traffic stream comprises an indication of at least one of the plurality of wireless links requiring admission control.

10. The method of claim 9, wherein the response to the request to the STA MLD comprises at least one traffic specification (TSPEC) element identifying at least one of the plurality of wireless links requiring admission control and a corresponding medium time thereof.

11. The method of claim 1, wherein the access control category comprises at least one of: AC_VO; AC_VI; AC_BE; and AC_BK.

12. The method of claim 1, further comprising receiving, by the AP MLD, a request to terminate the request to add a traffic stream associated with an access control category for the wireless link from the STA MLD.

13. The method of claim 12, wherein the request to terminate the request to add a traffic stream associated with an access control category for the wireless link is carried in a delete traffic stream (DELTS) frame.

14. A method of multi-link admission control for a wireless network, the method comprising:
transmitting, by a wireless station (STA) multi-link device (MLD), a request to add a traffic stream associated with an access category (AC) for a wireless link of the STA MLD to a wireless access point (AP) MLD;
receiving, by the STA MLD, a response from the AP MLD, wherein the response comprises a medium access time granted for Enhanced Distributed Channel Access (EDCA) over the wireless link for the AC, wherein the AP MLD comprises a plurality of wireless links requiring admission control;
computing, by the STA MLD a total medium time allowed for the AC based on the medium access time granted in the response;
storing, by the STA MLD, an amount of medium time used on the wireless link; and
updating, by the STA MLD, the amount of medium time used time following a successful frame exchange on the wireless link, wherein the AP MLD is operable to deny a subsequent request to add a traffic stream on the AC for EDCA when the amount of medium time used reaches the total medium time allowed for the AC, and wherein access control is performed by the AP MLD over the plurality of wireless links requiring admission control separately using different medium access time values.

15. The method of claim 14, further comprising receiving, by the STA MLD, a plurality of quality of service (QOS) frames associated with the access control category from the AP MLD, wherein the QoS frames are transmitted using EDCA over the wireless link according to the medium access time.

16. The method of claim 14, wherein the AP MLD stops transmitting QoS frames to the STA MLD after the medium access time is expired.

17. The method of claim 14, wherein the response comprises a plurality of TSPEC elements corresponding to the plurality of wireless links, and wherein at least one of the plurality of TSPEC elements comprises the medium access time.

18. The method of claim 14, wherein the AP MLD comprises a plurality of wireless links requiring admission control, and further comprising:
receiving, by the AP MLD, a first request to add a traffic stream associated with a first access control category for a first wireless link of the AP MLD from the STA MLD;
transmitting, by the AP MLD, a first response to the STA MLD, wherein the first response comprises a first medium access time granted for Enhanced Distributed Channel Access (EDCA) over the first wireless link;
receiving, by the AP MLD, a second request to add a traffic stream associated with a second access control category for a second wireless link of the AP MLD from the STA MLD; and
transmitting, by the AP MLD, a second response to the STA MLD, wherein the second response comprises a second medium access time granted for Enhanced Distributed Channel Access (EDCA) over the second wireless link.

19. An apparatus, comprising:
a plurality of transceivers operating different wireless links;
a memory; and
a processor operable to:
transmit a beacon frame indicating that admission control is enabled for a first wireless link of a plurality of wireless links requiring admission control;
receive a request to add a traffic stream associated with an access category (AC) for the wireless link from a wireless station (STA) MLD over the wireless link;
transmit a response to the STA MLD, wherein the response comprises a medium access time granted for Enhanced Distributed Channel Access (EDCA) over the wireless link for the AC, wherein the STA MLD computes a total medium time allowed over the wireless link for the AC based on the medium access time granted in the response, wherein the STA MLD computes an amount of medium time used following a successful frame exchange on the wireless link; and
deny a subsequent request to add a traffic stream on the AC for EDCA when the amount of medium time used reaches the total medium time allowed for the AC, and wherein access control is performed over the plurality of wireless links requiring admission control separately using different medium access time values.

* * * * *